UNITED STATES PATENT OFFICE.

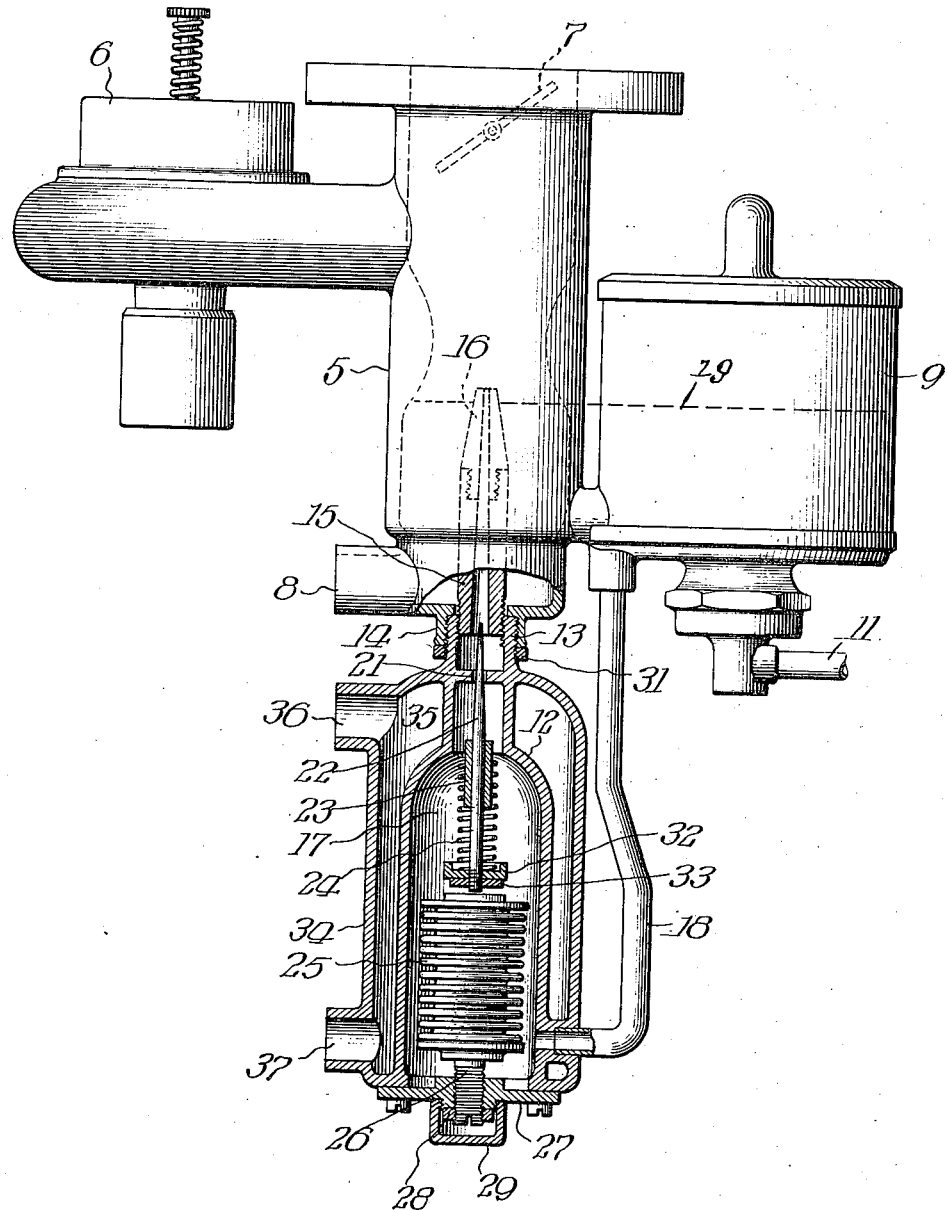

JAMES B. LUND, OF CHICAGO, ILLINOIS.

CARBURETER ATTACHMENT.

1,142,824.  Specification of Letters Patent.  Patented June 15, 1915.

Application filed August 13, 1913. Serial No. 784,504.

*To all whom it may concern:*

Be it known that I, JAMES B. LUND, a citizen of the United States, residing at Chicago, in the county of Cook and State of Illinois, have invented certain new and useful Improvements in Carbureter Attachments, of which the following is a specification.

This invention relates in general to carbureters and has more particular reference to a carbureter attachment adapted to control the flow of gasolene or other liquid to the carbureter so that a uniform feed is insured irrespective of the temperature of the liquid or of the pressure of the atmosphere.

It is a well recognized fact that the rate of flow of any liquid through a restricted orifice is proportional to the viscosity of said liquid and, it has been conclusively demonstrated that the viscosity of gasolene or liquids of light consistency is dependent primarily upon the temperature of such liquid. For example, the amount of gasolene which will flow at a temperature of about 50° F., through an orifice approximately the size of the discharge orifice of an ordinary carbureter jet will be increased in quantity about 60%, when the temperature of the gasolene is increased to 110° F. It will be manifest, therefore, that in the ordinary carbureter in which the float chamber is connected directly with the jet nozzle the quantity of gasolene drawn into the carbureter at a constant engine speed will vary proportionately to the temperature of the gasolene, with the result that when the weather is cold, or the engine is cold, an impoverished mixture will be produced, while on the other hand, if the weather is hot or the engine is hot the mixture will be too rich.

One of the objects of my present invention is to overcome this defect in the liquid feed of carbureters by providing a device which will throttle the liquid feed as the temperature of the liquid increase and increase the feed as the temperature decreases, thereby maintaining a constant liquid supply and a uniform mixture irrespective of the viscosity of the liquid.

It is well understood by those familiar with gas engines that the flow of gasolene from the jet nozzle into the vaporizing chamber of the carbureter is due to the difference in pressure between the pressure in the vaporizing chamber and the pressure exerted by the atmosphere upon the liquid in the float chamber or in the main supply tank.

The volume of air drawn through the carbureter will be practically constant for a constant engine speed but the weight of air per cubic inch drawn through the carbureter will vary with the atmospheric pressure; that is, when the atmospheric pressure is high more air in weight will be drawn through the carbureter at a certain engine speed than when the atmospheric pressure is low. In order to secure a mixture of uniform richness the flow of gasolene to the carbureter should be proportioned to the weight of air passing therethrough rather than to the volume of air passing through the carbureter or, otherwise, the mixture will be too poor in a low altitude, where the atmospheric pressure is high, and too rich when the engine is operated in a high altitude, where the atmospheric pressure is low. Furthermore, since the atmospheric pressure varies from day to day in any altitude it will be manifest that the mixture delivered to the cylinders will vary in richness from day to day in the same altitude unless provision is made to regulate the flow of gasolene in proportion to the weight of air passing through the carbureter.

Another object of the present invention, therefore, is to provide means adapted to be controlled by atmospheric pressure so that the liquid flow to the carbureter will be decreased as the atmospheric pressure falls and increased as the atmospheric pressure rises to thereby regulate the flow of liquid so that it will be proportioned to the weight of air drawn through the carbureter to produce a mixture of uniform richness.

Other objects and advantages of the invention will be apparent to those skilled in the art as the same becomes better understood by reference to the following description when considered in connection with the accompanying drawings on which the single figure represents a side elevation of a carbureter equipped with my invention, certain parts being shown in section.

On the drawings reference character 5 indicates, generally, a carbureter which may be of any well known or preferred construction, the one disclosed for purpose of illustration being equipped with the usual auxiliary airintake valve 6, the throttle 7 and the main air inlet pipe 8. The float chamber 9, which is ordinarily connected with the main supply tank (not shown) by a pipe 11, is preferably, for convenience in manufacture and for strength, cast integral with the carbureter, although it will be manifest that the float chamber may be structurally independent from and positioned remote from the carbureter, if preferred.

Ordinarily, communication is established between the float chamber and the jet nozzle of the carbureter directly through the side of the carbureter so that the gasolene, or other liquid employed, when the engine is not running, stands in the nozzle and in the float chamber at a common level.

My present invention is designed to provide in the supply passage leading from the float chamber to the jet nozzle a device adapted to be controlled both by the temperature of the liquid supplied to the nozzle and, also, by atmospheric pressure for regulating the flow of liquid to the nozzle. The embodiment of my invention disclosed in the drawings comprises a casing 12 having an upwardly extending boss 13 threaded exteriorly for connection with an interiorly threaded boss 14 projecting downwardly from the carbureter body and threaded interiorly to receive and support the body or stem 15 of the jet nozzle which may be provided at its upper end with a contracted spraying device 16. A passageway 17 is, therefore provided within the casing 12 and a pipe 18, connected with the passageway near the bottom thereof and also connected with the float chamber, establishes communication between the float chamber and the passageway so that liquid may flow from the float chamber through the pipe and passage into the spraying nozzle where it will stand at the same level as the liquid in the float chamber, this level being indicated on the drawings by the dotted line 19.

Within the upper portion of the passageway 17 I have formed a dividing wall provided with a restricted aperture 21 forming the seat for a tapered needle-valve 22 mounted to reciprocate in a fixed guideway 23 and normally held in lowered or opened position by a coiled expansion spring 24. Beneath the needle and in alinement therewith I have positioned a device 25 supported upon a stud 26 threaded into the plate 27 normally closing the lower end of the passageway 17, the outer end of the stud being slotted to receive a screw-driver by means of which the height of the device in the passageway may be adjusted when desired. This device is sensitive to both temperature and pressure and is adapted to expand when heated and contract when cooled and, also, to contract under the influence of external pressure and to expand as the pressure exerted thereon decreases, the expansion and contraction taking place in all instances along the longitudinal axis of the device.

A lock-nut 28 may be utilized to lock the device in adjusted position and a cap 29 may be threaded over the end of the stud 26 to prevent tampering with or accidental interference with the adjustment of the device. A lock-nut 31 may also be utilized to lock the attachment to the carbureter body.

In order to provide an additional adjustment to compensate for variations in the strength of the spring 24, or for variations in sensitiveness of the device 25, the lower end of the needle 23 is provided with an adjustable stop 32 against which the lower end of the spring 24 abuts, this stop being threadedly engaged with the needle and held in adjusted position by a lock-nut 33.

The spring 24 normally urges the needle into lowered position to enlarge the aperture 21 around the needle while expansion of the device 25 longitudinally will force the needle upwardly against the action of the spring 24 to restrict the aperture 21 and thereby cut down the flow of liquid from the float chamber to the jet nozzle.

If the temperature of the liquid in the float chamber and in the passageway 17 is low, its viscosity will be high, with the result that under a constant pressure the flow to the nozzle through a restricted aperture of constant size will be less than it would be were the temperature of the liquid high. When the temperature of the liquid is low the device 25 will be contracted so that the needle 22 will move downwardly to provide a relatively large passage through the aperture 21 for the flow of liquid, but if the parts have been heated up by the running of the engine the temperature of the liquid will rise whereupon the device 25 will expand proportionately to the increase in temperature of the liquid and the needle will be moved upwardly to restrict the passage through the aperture 21, so that the flow of liquid therethrough will remain practically constant instead of increasing with the increase of temperature as it normally would if the size of the aperture remained constant. Ordinarily, the temperature of the liquid supplied to the carbureter will vary with the temperature of the atmosphere and, also, with the temperature of the engine, but, in order to provide for additional temperature regulation when desired, I have surrounded the passageway 17 with a jacket 34 providing a space 35 around the passageway having suitable inlet and outlet connections 36 and 37, respectively, which may be connected to the exhaust pipe of the engine or to a cooling source, if desired, so that the temperature of the engine will more directly influence the temperature of the liquid supplied to the carbureter. It will be manifest from the foregoing that I have provided a device which will regulate the size of the aperture through which the liquid flows to the carbureter in direct relation to the temperature and viscosity of the liquid so that a uniform flow will be secured to produce a mixture of uniform richness.

The negative pressure in the vaporizing chamber of the carbureter, or, as it is commonly termed, the vacuum, is practically constant for any predetermined engine speed, but the atmospheric pressure exerted on the liquid in the float chamber and, incidentally, in the passageway 17 varies with different altitudes and different atmospheric conditions. If the atmospheric pressure is high, more pounds of air will be drawn through the carbureter at a predetermined engine speed than if the atmospheric pressure is low and a uniform richness of mixture requires that the flow of liquid to the vaporizing chamber be increased as the atmospheric pressure increases and decreased as the pressure decreases, so that the liquid delivered to the chamber will be proportional to the pounds of air drawn through the chamber.

My present invention is designed to accomplish this result automatically for the reason that as the pressure in the chamber 17 increases, due to increase in atmospheric pressure, the device 25 will contract under the influence of the pressure exerted thereon, thereby opening the needle-valve to permit an increased flow of liquid to the vaporizing chamber and, when the pressure of the liquid in the passageway 17 around the device decreases in proportion to the decrease in atmospheric pressure, the device will expand to thereby partially close the needle-valve and cut down the flow of liquid proportionately to the decrease in atmospheric pressure, thereby insuring a flow of liquid to the vaporizing chamber directly proportional to the pounds of air drawn therethrough with the result that a mixture of uniform richness is produced.

While I have shown and described a preferred embodiment of my invention for automatically regulating the flow of liquid to a carbureter in proportion to temperature variations of the liquid and in proportion to variations in atmospheric pressure, it will be manifest that the construction disclosed is illustrative merely and that various changes in mechanical details disclosed may be resorted to without departing from the spirit of the invention or sacrificing any of its material advantages.

I claim:

1. A carbureter attachment comprising a casing adapted to be interposed between the vaporizing chamber and the float chamber of the carbureter, a jet nozzle carried by said casing and protruding into the vaporizing chamber, a vertically disposed needle-valve, a spring normally holding said valve in open position, and means adapted to be actuated by variations in temperature and pressure of the liquid in said passage disposed beneath the needle-valve in position to move the same toward closed position against the force of said spring.

2. A carbureter attachment comprising a casing connected with the vaporizing chamber of the carbureter and constructed to form a supply passage to said chamber, a needle valve disposed in said passage, a temperature and pressure actuated device disposed beneath said valve, adjustable means for normally urging said valve into open position, means for adjusting the position of said device with respect to said valve, and a jacket surrounding said passage whereby the temperature of said device may be regulated.

JAMES B. LUND.

Witnesses:
IRA J. WILSON,
M. A. KIDDIE.